(12) United States Patent
Kim et al.

(10) Patent No.: US 12,244,934 B2
(45) Date of Patent: Mar. 4, 2025

(54) SYSTEM ON CHIP AND MOBILE DEVICE INCLUDING THE SAME

(71) Applicant: Samsung Electronics Co., Ltd., Suwon-si (KR)

(72) Inventors: Sun-Ae Kim, Yongin-si (KR); Seong Woon Kim, Suwon-si (KR); Kil Whan Lee, Seoul (KR); Sang Hoon Lee, Seoul (KR); Yong Kwon Cho, Yongin-si (KR); Sang Hoon Ha, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 332 days.

(21) Appl. No.: 17/728,421

(22) Filed: Apr. 25, 2022

(65) Prior Publication Data
US 2023/0070191 A1    Mar. 9, 2023

(30) Foreign Application Priority Data
Sep. 6, 2021    (KR) .................. 10-2021-0118305

(51) Int. Cl.
| | |
|---|---|
| H04N 23/741 | (2023.01) |
| G06T 1/20 | (2006.01) |
| G06T 1/60 | (2006.01) |
| G06T 5/92 | (2024.01) |

(52) U.S. Cl.
CPC ............. *H04N 23/741* (2023.01); *G06T 1/20* (2013.01); *G06T 1/60* (2013.01); *G06T 5/92* (2024.01); *G06T 2207/20208* (2013.01)

(58) Field of Classification Search
CPC .......... H04N 23/74; H04N 23/73; G06T 1/20; G06T 1/60; G06T 5/92; G06T 2207/20208; G06T 15/205; G06T 2200/28; G06T 5/90; G06F 15/7807
See application file for complete search history.

(56) References Cited

U.S. PATENT DOCUMENTS

| | | | |
|---|---|---|---|
| 8,593,480 B1 | 11/2013 | Ballestad et al. | |
| 8,879,628 B2 | 11/2014 | Tourapis et al. | |
| 10,009,613 B2 | 6/2018 | Seifi et al. | |
| 10,187,622 B1 | 1/2019 | Chappalli et al. | |
| 10,277,771 B1* | 4/2019 | Haynold | H04N 1/2137 |
| 10,432,952 B2 | 10/2019 | Jacobson et al. | |
| 10,674,150 B2 | 6/2020 | Baylon et al. | |
| 10,681,321 B2 | 6/2020 | Sun et al. | |
| 10,979,729 B2 | 4/2021 | Rusanovskyy et al. | |
| 2021/0365230 A1* | 11/2021 | Sul | G06F 3/1446 |

* cited by examiner

*Primary Examiner* — Yogesh K Aggarwal
(74) *Attorney, Agent, or Firm* — Harness, Dickey & Pierce, P.L.C.

(57) ABSTRACT

A system on chip and a mobile device are provided, the mobile device including a processor that receives raw image data, processes the raw image data into floating-point format image data, and output the floating-point format image data; a memory that stores therein the floating-point format image data; and a display processing unit that receives the floating-point format image data stored in the memory therefrom, and performs high dynamic range (HDR) processing on the floating-point format image data.

20 Claims, 11 Drawing Sheets

SYSTEM ON CHIP AND MOBILE DEVICE INCLUDING THE SAME

CROSS-REFERENCE TO RELATED APPLICATION

This application claims priority from Korean Patent Application No. 10-2021-0118305 filed on Sep. 6, 2021 in the Korean Intellectual Property Office, and all the benefits accruing therefrom under 35 U.S.C. 119, the contents of which in its entirety are herein incorporated by reference.

BACKGROUND

Field

Example embodiments relate to a system on chip and a mobile device including the same.

Description of Related Art

A DR (Dynamic Range) of an image means a range from the brightest portion to the darkest portion thereof. A DR perceived by a human eye is about 10,000 nits. An image input to a display has LDR (Low Dynamic Range) or SDR (Standard Dynamic Range) of about 100 nits. Thus, there is a limit to realizing realistic image quality.

HDR (High Dynamic Range) processing means a processing that makes a bright area brighter and a dark area darker in an image to extend the dynamic range closer to a range in which a person sees the image with an actual eye.

SUMMARY

Example embodiments provides a mobile device capable of outputting a high-quality image.

Example embodiments also provides a system on chip capable of outputting high-quality image data.

The example embodiments are not limited to the above-mentioned example embodiments. Other embodiments and advantages that are not mentioned may be understood based on following descriptions and may be more clearly understood based on example embodiments. Further, the advantages of the example embodiments will be easily understood and may be realized using means shown in the claims and combinations thereof.

According to some example embodiments, there is provided a mobile device comprises a processor configured to receive raw image data, process the raw image data into floating-point format image data, and output the floating-point format image data, a memory configured to store therein the floating-point format image data, and a display processing unit configured to receive the floating-point format image data stored in the memory therefrom, and perform high dynamic range (HDR) processing on the floating-point format image data.

According to some example embodiments, there is provided a mobile device comprises a memory configured to store therein floating-point format image data, and a display processing unit configured to directly receive the floating-point format image data stored in the memory therefrom, and perform high dynamic range (HDR) processing on the floating-point format image data, wherein the display processing unit includes an integer image processing unit configured to perform integer arithmetic, and a first converter configured to receive the floating-point format image data, convert the floating-point format image data into fixed-point format image data, and provide the fixed-point format image data to the integer image processing unit.

According to some example embodiments, there is provided a system on chip (SoC) comprises a processor configured to receive raw image data, process the raw image data, and store the processed image data in a memory, an integer image processing unit configured to perform integer arithmetic, a floating-point image processing unit configured to perform floating-point arithmetic related to HDR processing, and an interfacing device for receiving the processed image data from the memory, wherein the interfacing device is configured to perform at least one of: in response to the processed image data provided from the memory being floating-point format image data, directly provide the floating-point format image data to the floating-point image processing unit, or in response to the processed image data provided from the memory being fixed-point format image data, provide the fixed-point format image data to the integer image processing unit.

BRIEF DESCRIPTION OF DRAWINGS

The above and other features of example embodiments will become more apparent by being describing in detail with reference to the attached drawings, in which.

DETAILED DESCRIPTIONS

Figure 1:
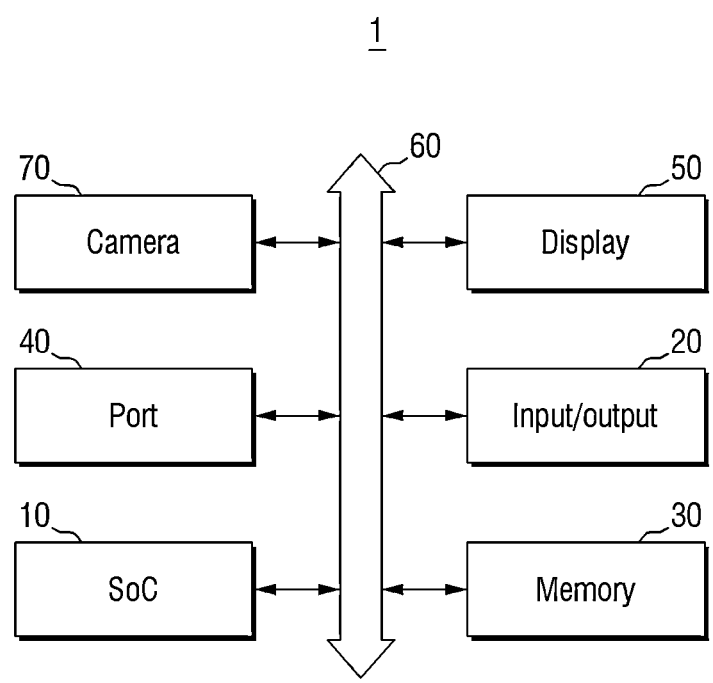
FIG. 1 is a block diagram of an electronic device including a SoC (System on Chip) according to some example embodiments.

Hereinafter, example embodiments will be described with reference to the accompanying drawings.

The same reference numbers in different drawings represent the same or similar elements, and as such perform similar functionality. Further, descriptions and details of well-known steps and elements are omitted for simplicity of the description. Furthermore, in the following detailed description of the drawings, numerous specific details are set forth in order to provide a thorough understanding of the example embodiments. However, it will be understood that the example embodiments may be practiced without these specific details. In other instances, well-known methods, procedures, components, and circuits have not been described in detail so as not to unnecessarily obscure example embodiments. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the example embodiments as defined by the appended claims.

The terminology used herein is for the purpose of describing particular embodiments only and is not intended to be limiting. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer, or section described below could be termed a second element, component, region, layer or section, without departing from the spirit and scope of the example embodiments.

In addition, it will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a suffix "module" or "unit" as used for a component is intended only for ease of describing the example embodiments, and the suffix "module" or "unit" itself does not have a specific meaning or role.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various example embodiments may be partially or entirely combined with each other and may be technically associated with each other or operate with each other. The embodiments may be implemented independently of each other and may be implemented together in an association relationship.

Figure 2:
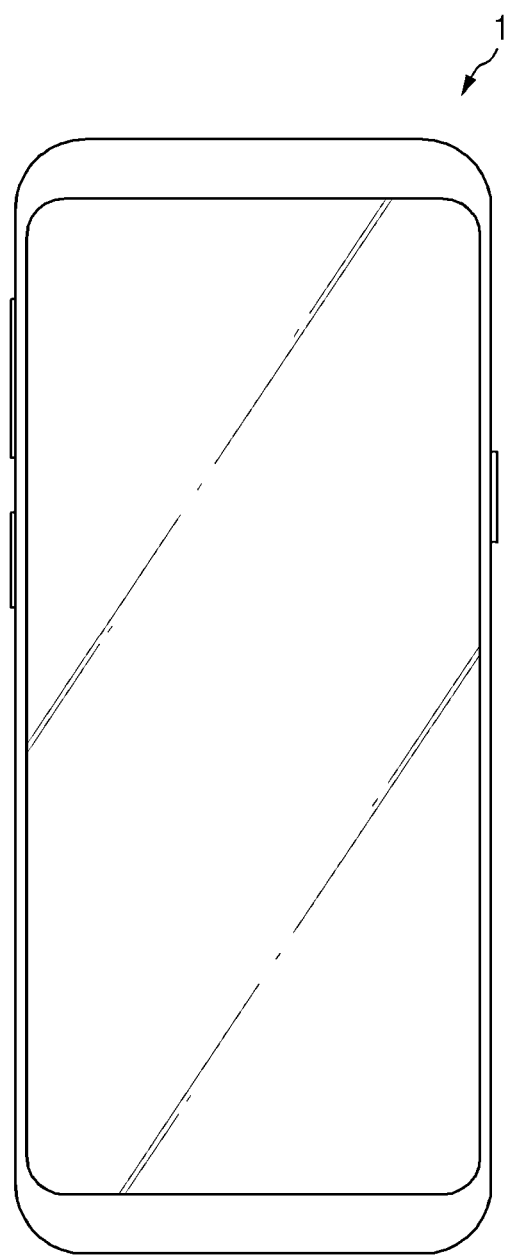
FIG. 2 is a diagram showing an electronic device on which a SoC according to some example embodiments is mounted.
Figure 3:
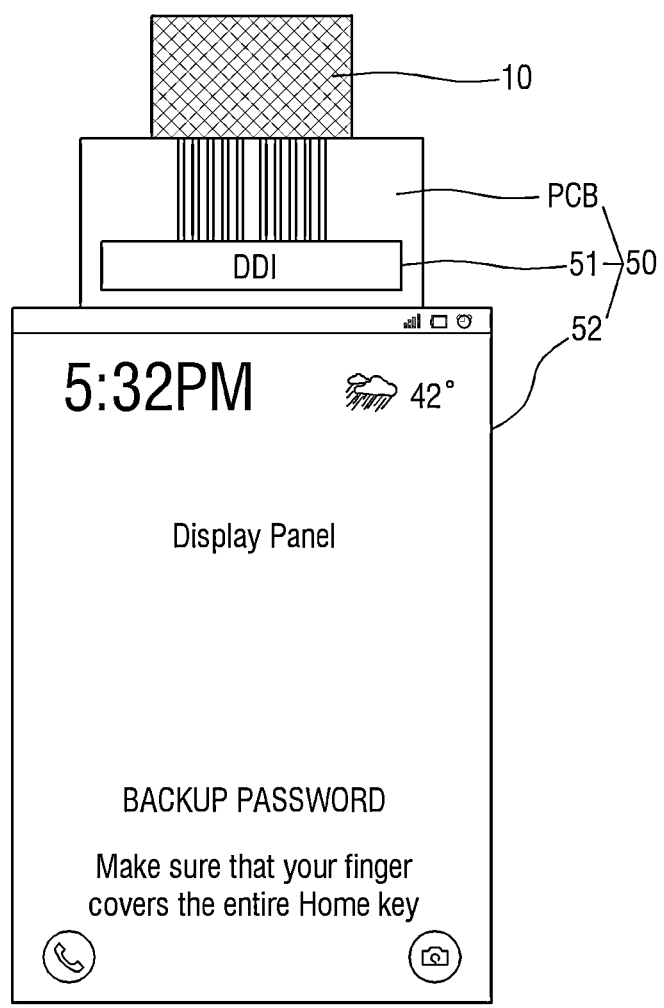
FIG. 3 is a diagram illustrating a configuration in which a SoC according to some example embodiments is coupled to a display device.

FIG. 1 is a block diagram of an electronic device including a SoC (System on Chip) according to some example embodiments. FIG. 2 is a diagram showing an electronic device on which the SoC according to some example embodiments is mounted. FIG. 3 is a diagram illustrating a configuration in which the SoC according to some example embodiments is coupled to a display device.

Referring to FIG. 1 to FIG. 3, an electronic device 1 may include a system on chip (hereinafter referred to as a SoC) 10, an input/output unit 20, a memory 30, a port 40, a display device 50, a bus 60, a camera module 70, etc.

The electronic device 1 may be, for example, a smartphone as shown in FIG. 2. Although the smartphone is shown as an example of the electronic device 1 in FIG. 2, a mobile device such as a tablet PC and a laptop computer may act as an example of the electronic device 1. Further, in some example embodiments, a television, a desktop computer, etc. may act as an example of the electronic device 1.

The SoC 10, the input/output unit 20, the memory 30, the port 40, the display device 50 and the camera module 70 may communicate with each other via the bus 60.

The SoC 10 may generate image data. In some example embodiments, the SoC 10 may include an application processor (AP) mounted on a mobile device. However, an embodiment is not limited thereto.

In some example embodiments, the SoC 10 may process image data output from the camera module 70 and transmit the processed image data to the display device 50. In some example embodiments, the SoC 10 may process image data stored in the memory 30 and transmit the processed image data to the display device 50. In some example embodiments, the SoC 10 may process image data input through the input/output unit 20 and transmit the processed image data to the display device 50.

The display device 50 may include, for example, a display panel 52, a display driver IC 51 and a PCB (Printed Circuit Board) substrate PCB. The display panel 52, the display driver IC 51 and the SoC 10 may be connected to each other via the PCB substrate PCB. However, embodiments are not limited thereto.

In some example embodiments, the display driver IC 51 may display the image data transmitted from the SoC 10 via the bus 60 on the display panel 52 based on an operation mode. The display driver IC 51 may generate a number of data voltages (e.g., gray level voltages) corresponding to a number of bits of image data transmitted from the SoC 10.

In some example embodiments, when the electronic device 1 is embodied as a mobile device, the PCB substrate PCB may include a flexible PCB substrate PCB. The flexible PCB substrate PCB may be folded. The display driver IC 51 and the SoC 10 may be attached thereto. The display driver IC 51 and the SoC 10 may be disposed on a back face of the display panel 52 in a state in which the flexible PCB substrate PCB has been folded.

The memory 30 may be used as, for example, a main memory for the electronic device 1, and may include a volatile memory such as SRAM or DRAM. However, embodiments are not limited thereto. The memory 30 may include a non-volatile memory such as a flash memory, PRAM, and RRAM. In some example embodiments, the memory 30, the SoC 10 and the main processor 1100 may be mounted in the same package. Further, although not shown separately in FIG. 1, the electronic device 1 may further include a storage device for data storage such as, for example, an SSD.

Figure 4:
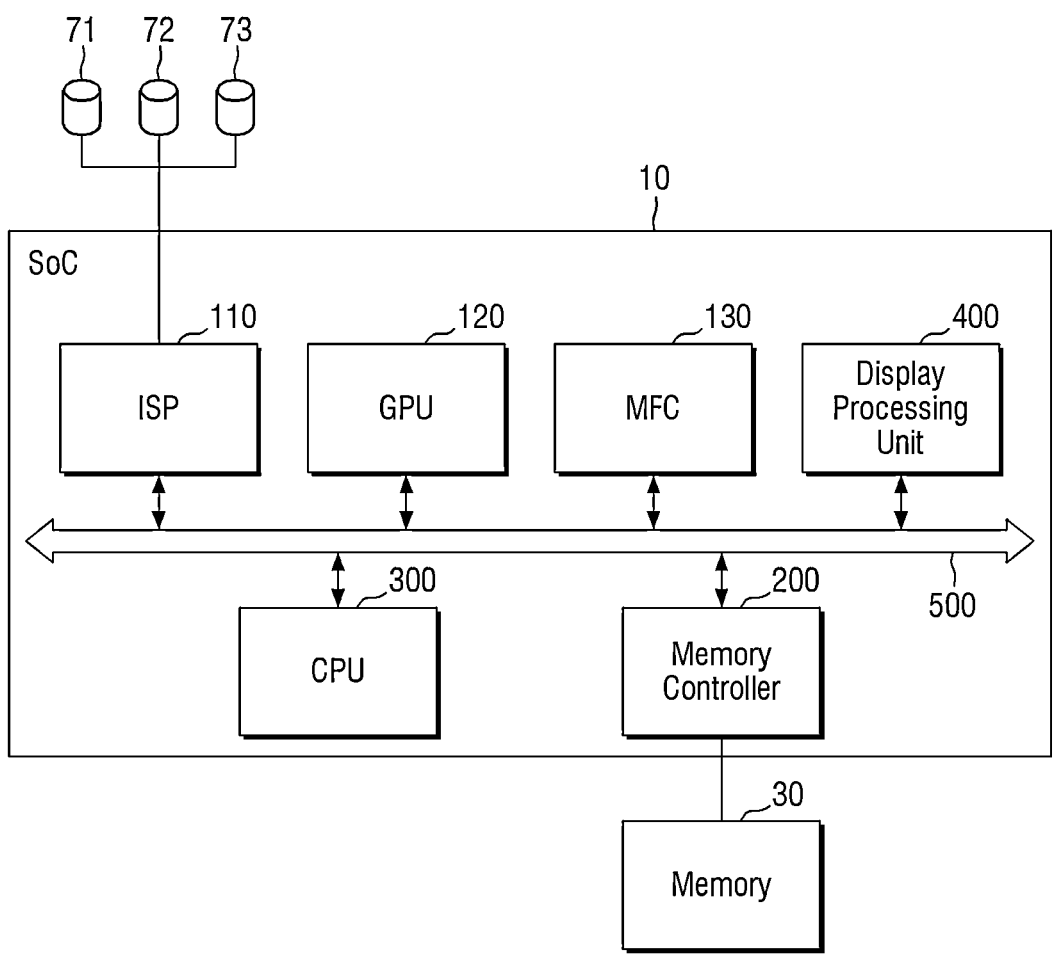
FIG. 4 is a diagram illustrating an SoC according to some example embodiments.
Figure 5:
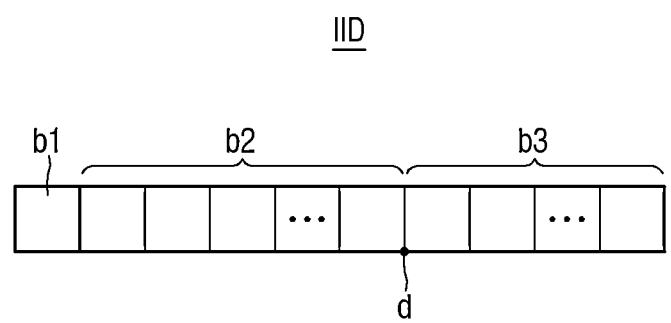
FIG. 5 is a diagram illustrating fixed-point format image data.
Figure 6:
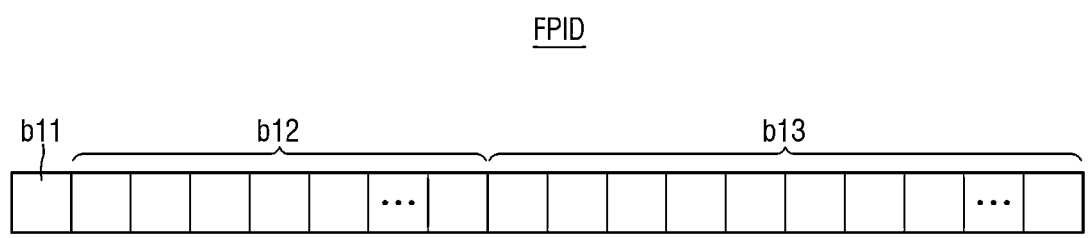
FIG. 6 is a diagram illustrating floating-point format image data.
Figure 7:
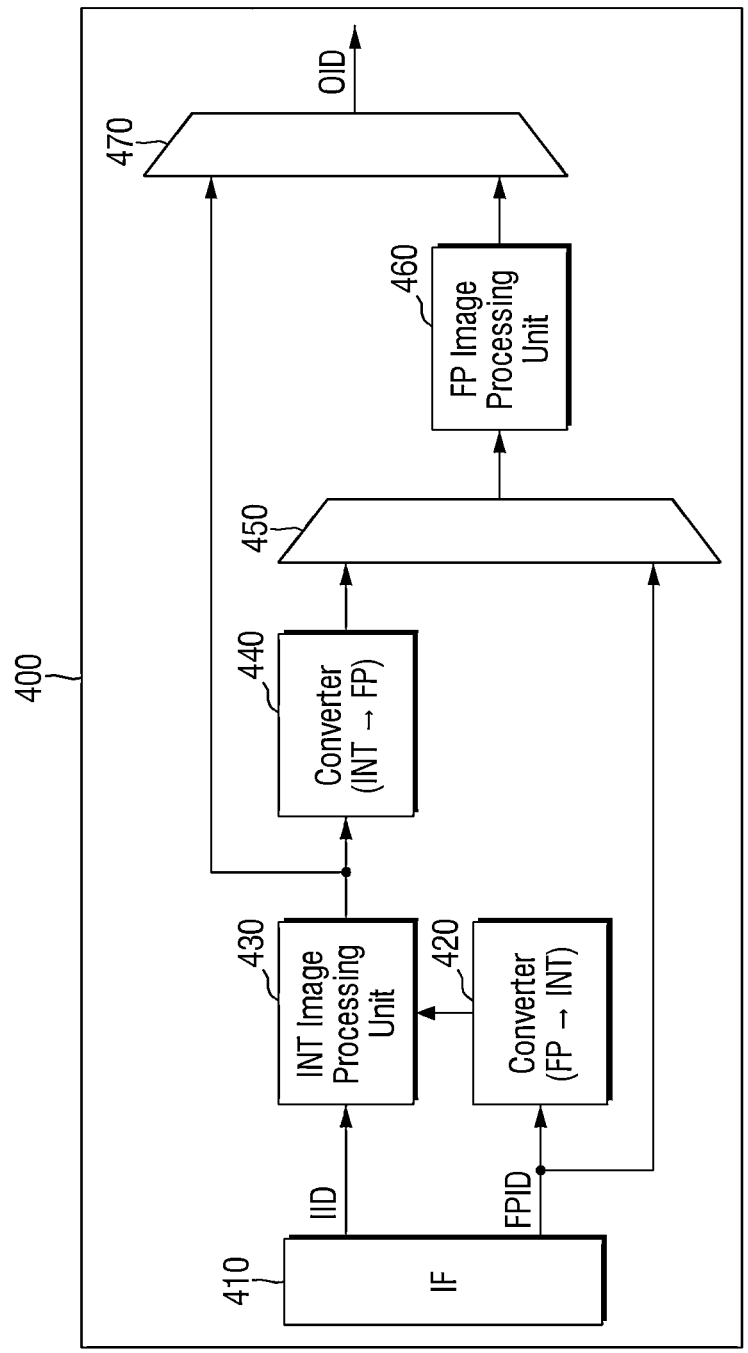
FIG. 7 is a diagram illustrating a display processing unit.

FIG. 4 is a diagram illustrating an SoC according to some example embodiments. FIG. 5 is a diagram for illustrating fixed-point format image data. FIG. 6 is a diagram for illustrating floating-point format image data. FIG. 7 is a diagram for illustrating a display processing unit.

Referring to FIG. 4, the SoC 10 may include an ISP (Image Signal Processor) 110, a GPU (Graphic Processing Unit) 120, a MFC (Multi Format Codec) 130, a memory controller 200, a CPU (Central Processing Unit) 300 and a DPU (Display Processing Unit) 400, etc.

The ISP 110, the GPU 120, the MFC 130, the memory controller 200, the CPU 300 and the DPU 400 may be connected to each other via a bus 500 and may exchange data with each other.

In some example embodiments, the bus 500 may be embodied as AMBA (advanced microcontroller bus architecture), AHB (advanced high-performance bus), APB (advanced peripheral bus), AXI (advanced eXtensible interface), ASB (advanced system bus), or a combination thereof. However, embodiments are not limited thereto.

The CPU 300 may control the ISP 110, the GPU 120, the MFC 130, the memory controller 200, and the DPU 400 via the bus 500. In some example embodiments, the CPU 300 may be implemented in a multi-core form. However, embodiments are not limited thereto.

The ISP 110 may convert a format of raw image data output from the camera modules 71, 72, and 73, or perform operations for noise reduction, and image enhancement on the raw image data.

For example, the ISP 110 may convert first image data having a first format output from the camera modules 71, 72, and 73 into second image data having a second format. For example, the first format may mean a Bayer format, while the second format may mean an RGB format or a YUV format.

Each of the camera modules 71, 72, and 73 may include a CMOS image sensor chip. In FIG. 4, three camera modules 71, 72, and 73 are exemplified. However, embodiments are not limited thereto. The number of camera modules 71, 72, and 73 connected to the ISP 110 may vary.

FIG. 4 shows an embodiment in which the ISP 110 is implemented inside the SoC 10. In some example embodiments, the ISP 110 may be implemented as an independent chip disposed between the SoC 10 and the camera modules 71, 72, and 73. In some other example embodiments, the ISP 110 may be disposed inside of each of the camera modules 71, 72, and 73, and the CMOS image sensor chip and the ISP 110 implemented inside each of the camera modules 71, 72, and 73 may be assembled into a single package.

An output of the ISP 110 may be sent to the DPU 400 via the memory 30.

The memory controller 200 may write image data output from the ISP 110, the GPU 120, and the MFC 130 to the memory 30. In addition, the memory controller 200 may read the image data stored in the memory 30 and transmit the read image data to the DPU 400.

The memory controller 200 may control a data access operation to at least one memory 30 under control of the CPU 300. The data access operation may include a write operation that writes data to the memory 30 and a read operation that reads the data from the memory 30.

The GPU 120 may perform rendering on the raw image data provided, for example, from the memory 30. The thus rendered image data may be transferred to the DPU 400 via the memory 30.

The MFC 130 may include an encoder and a decoder (not shown). The encoder may perform a function of a compressor, while the decoder may perform a function of a decompressor.

For example, the encoder may encode the raw image data into image data to be stored in the memory 30. The decoder may decode the raw image data output from the memory 30.

The memory 30 may include a volatile memory and/or a non-volatile memory. The volatile memory may include RAM (random access memory), DRAM (dynamic RAM), SRAM (static RAM), or a buffer memory. The non-volatile memory may be embodied as a flash memory, MRAM (magnetic RAM), spin-transfer torque MRAM, FeRAM (ferroelectric RAM), PRAM (phase change RAM), or RRAM (resistive memory). The flash memory may be implemented as a NAND-type flash memory or a NOR-type flash memory for storing one or more bits. A flash-based memory may be implemented as SSD (solid-state drive or solid-state disk), a multimedia card (MMC), eMMC (embedded MMC), an USB flash drive, or a universal flash storage (UFS).

For example, the memory 30 may be implemented as the DRAM. The memory controller 200 may be implemented as a DRAM controller. However, embodiments are not limited thereto.

In this embodiment, the ISP 110, the GPU 120, and the MFC 130 may perform the image data processing and then may output the fixed-point format image data. Alternatively, the ISP 110, the GPU 120, and MFC 130 may perform the image data processing and then may output the floating-point format image data.

Referring to FIG. 5, the fixed-point format image data IID may include a sign bit b1, an integer part bit b2, and a fractional part bit b3. In this connection, the integer part bit b2 constitutes integer data of the image data, and the fractional part bit b3 after a decimal point d constitutes fractional part data of the image data.

Referring to FIG. 6, the floating-point format image data FPID may include a sign bit b11, an exponent bit b12, and a fraction bit b13.

In some example embodiments, the floating-point format image data FPID may comply with the IEEE 754 standard. For example, when the image data is 32-bit data, the sign bit b11 may be 1-bit data, the exponent bit b12 may be 8 bits data, and the fraction bit b13 may be 23 bits data. However, embodiments are not limited thereto.

When the ISP 110, the GPU 120 and the MFC 130 output the fixed-point format image data IID, the memory 30 stores therein the fixed-point format image data IID. Alternatively, when the ISP 110, the GPU 120 and the MFC 130 output the floating-point format image data FPID, the memory 30 stores therein the floating-point format image data FPID.

The DPU 400 may receive the image data output from the ISP 110, the GPU 120, and the MFC 130, and may perform predefined image processing thereon. In some example embodiments, the DPU 400 may receive the image data output from the ISP 110, the GPU 120 and the MFC 130 and perform HDR processing thereon.

The DPU 400 may transmit the image data subjected to the image processing to the display driver IC (51 of FIG. 3) as described above. In some example embodiments, the DPU 400 may be embodied as a display controller.

The DPU 400 may receive the image data stored in the memory 30 under control of the memory controller 200. When the ISP 110, the GPU 120 and the MFC 130 outputs the fixed-point format image data IID and writes the data IID to the memory 30, the DPU 400 may receive the fixed-point format image data IID therefrom. In addition, when the ISP 110, the GPU 120 and the MFC 130 outputs the floating-point format image data FPID and writes the data FPID to the memory 30, the DPU 400 may receive the floating-point format image data FPID therefrom.

Referring to FIG. 7, the DPU 400 may include an interfacing device 410, a first converter 420, an integer image processing unit 430, a second converter 440, a first multiplexer 450, a floating-point image processing unit 460, and a second multiplexer 470.

The interfacing device 410 may provide the fixed-point format image data IID to the integer image processing unit 430 when the image data provided from the memory 30 is the fixed-point format image data IID. Alternatively, when the image data provided from the memory 30 is the floating-point format image data FPID, the interfacing device 410 may provide the floating-point format image data FPID to the first converter 420 and the first multiplexer 450. That is, the interfacing device 410 may change a path along which the image data is processed in the DPU 400, based on the type of the image data provided from the memory 30.

The first converter 420 may convert the floating-point format image data FPID into the fixed-point format image data IID. Alternatively, the first converter 420 may convert the floating-point format image data FPID into integer data which may be subjected to data processing by the integer image processing unit 430. In this connection, the integer data includes data of the integer part bit b2 in FIG. 5 as described above.

The first converter 420 may be enabled in response to a predefined enable signal. For example, when the image data provided from the memory 30 is the floating-point format image data FPID, the first converter 420 may be enabled to perform a conversion operation so that integer arithmetic may be performed on the floating-point format image data FPID by the integer image processing unit 430. To the contrary, when the image data provided from the memory 30 is the floating-point format image data FPID, the first converter 420 may be disabled, because and the integer arithmetic is not required.

The integer image processing unit 430 may perform integer arithmetic on the fixed-point format image data IID provided from the interfacing device 410 or the converted data provided from the first converter 420. In this connection, the integer arithmetic includes performing arithmetic using integer data of the image data.

The second converter 440 may receive an output of the integer image processing unit 430 and convert the received output into the floating-point format image data FPID. When the output of the integer image processing unit 430 is the integer data, the second converter 440 may convert the integer data into the floating-point format image data FPID which may be subjected to arithmetic by the floating-point image processing unit 460.

The second converter 440 may also be enabled in a response to a predefined enable signal. That is, the second converter 440 may be enabled to perform a conversion operation so that the arithmetic on the output of the integer image processing unit 430 by the floating-point image processing unit 460 may be performed. The second converter 440 may be disabled when the arithmetic on the output of the integer image processing unit 430 by the floating-point image processing unit 460 is not performed or required.

The first multiplexer 450 may select one of the floating-point format image data FPID output from the interfacing device 410 and an output of the second converter 440 and provide the selected one to the floating-point image processing unit 460.

When the image data provided from the memory 30 is the fixed-point format image data IID, the first multiplexer 450 provides the output of the second converter 440 to the floating-point image processing unit 460 so that the arithmetic on the output of the integer image processing unit 430 by the floating-point image processing unit 460 may be performed. Alternatively, the first multiplexer 450 also provides the output of the second converter 440 to the floating-point image processing unit 460 when the image data provided from the memory 30 is the floating-point format image data FPID or the integer arithmetic by the integer image processing unit 430. Alternatively, when the image data provided from the memory 30 is the floating-point format image data FPID, and the integer arithmetic by the integer image processing unit 430 is not required, the first multiplexer 450 provides the floating-point format image data FPID output from the interfacing device 410 to the floating-point image processing unit 460.

The floating-point image processing unit 460 may perform floating-point arithmetic related to HDR processing. In some example embodiments, the floating-point arithmetic may include color gamut mapping and tone mapping.

The second multiplexer 470 may select one of the outputs of the integer image processing unit 430 and the output of the floating-point image processing unit 460 and output the selected one as output image data OID.

The second multiplexer 470 may select the output of the integer image processing unit 430 when the arithmetic by the integer image processing unit 430 generates the output image data OID. The second multiplexer 470 may select the output of the floating-point image processing unit 460 when the arithmetic by the floating-point image processing unit 460 generates the output image data OID.

Hereinafter, with reference to FIG. 8 to FIG. 11, an operation of the display processing unit is described.

FIGS. 8 to 11 are diagrams for illustrating the operation of the display processing unit.

Figure 8:
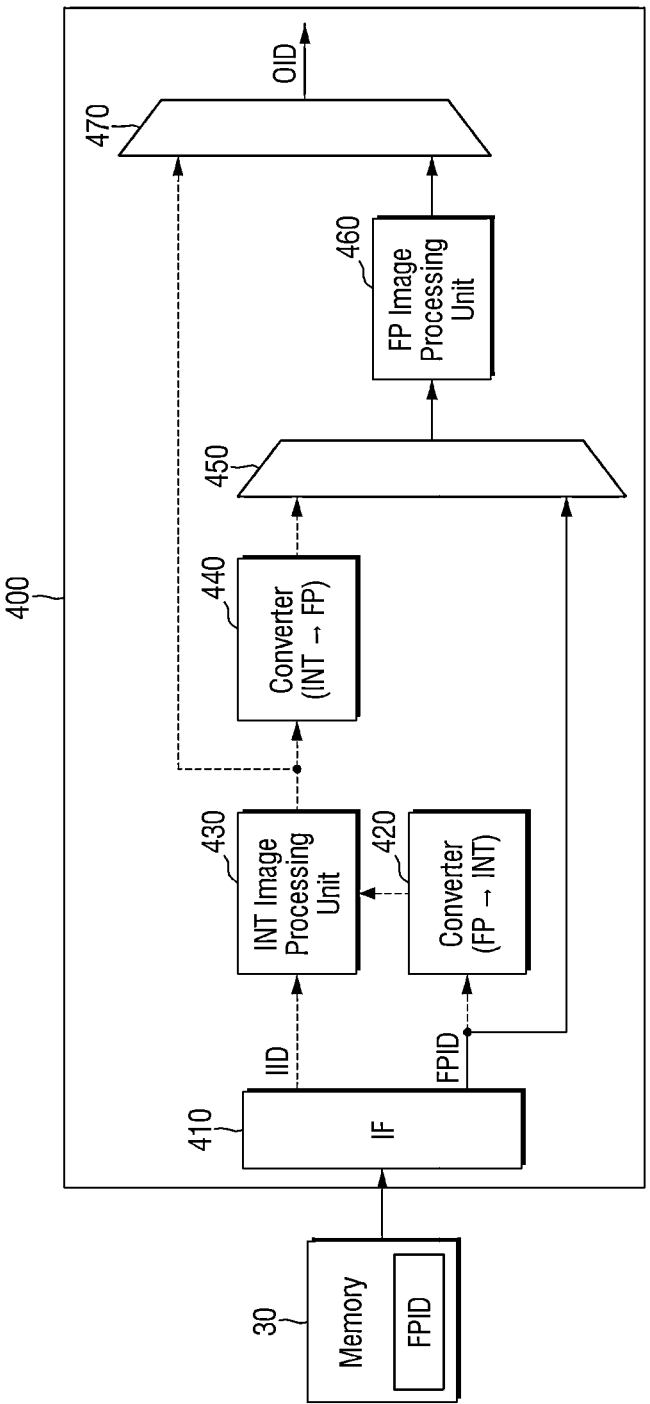
FIGS. 8 to 11 are diagrams illustrating an operation of the display processing unit.

First, FIG. 8 is a diagram showing an operation of the DPU 400 when one of the ISP 110, the GPU 120, and the MFC 130 writes the floating-point format image data FPID as the processing result to the memory 30. In this connection, it is assumed that the arithmetic on the floating-point format image data FPID by the integer image processing unit 430 is not required.

Referring to FIG. 8, because the image data provided from the memory 30 is the floating-point format image data FPID, the interfacing device 410 provides the floating-point format image data FPID provided from the memory 30 to the first converter 420 and the first multiplexer 450.

Because the arithmetic on the floating-point format image data FPID by the integer image processing unit 430 is not required, the first converter 420 is disabled.

The first multiplexer 450 may transmit the floating-point format image data FPID provided from the interfacing device 410 to the floating-point image processing unit 460. The floating-point image processing unit 460 may perform the floating-point arithmetic related to HDR processing, such as color gamut mapping and tone mapping, thereby generating the output image data OID.

That is, in the DPU 400 according to this embodiment, there is a path in which the floating-point image processing unit 460 performs the floating-point arithmetic related to HDR processing, such as color gamut mapping and tone mapping, while not performing a separate conversion process on the floating-point format image data FPID stored in the memory 30. In other words, the floating-point image processing unit 460 may directly receive the floating-point format image data FPID stored in the memory 30 and may perform the floating-point arithmetic related to HDR processing, such as color gamut mapping and tone mapping.

In the HDR processing, high-quality image data may be generated only when the image data is processed in a floating-point manner. In this embodiment, the high-quality image data may be generated and output by excluding a path in which the integer arithmetic is performed on the image data processed in the ISP 110, the GPU 120 and the MFC 130 from the DPU 400 but including a path in which floating-point arithmetic directly related to the HDR processing is performed on the image data processed in the ISP 110, the GPU 120 and the MFC 130 into the DPU 400.

Figure 9:
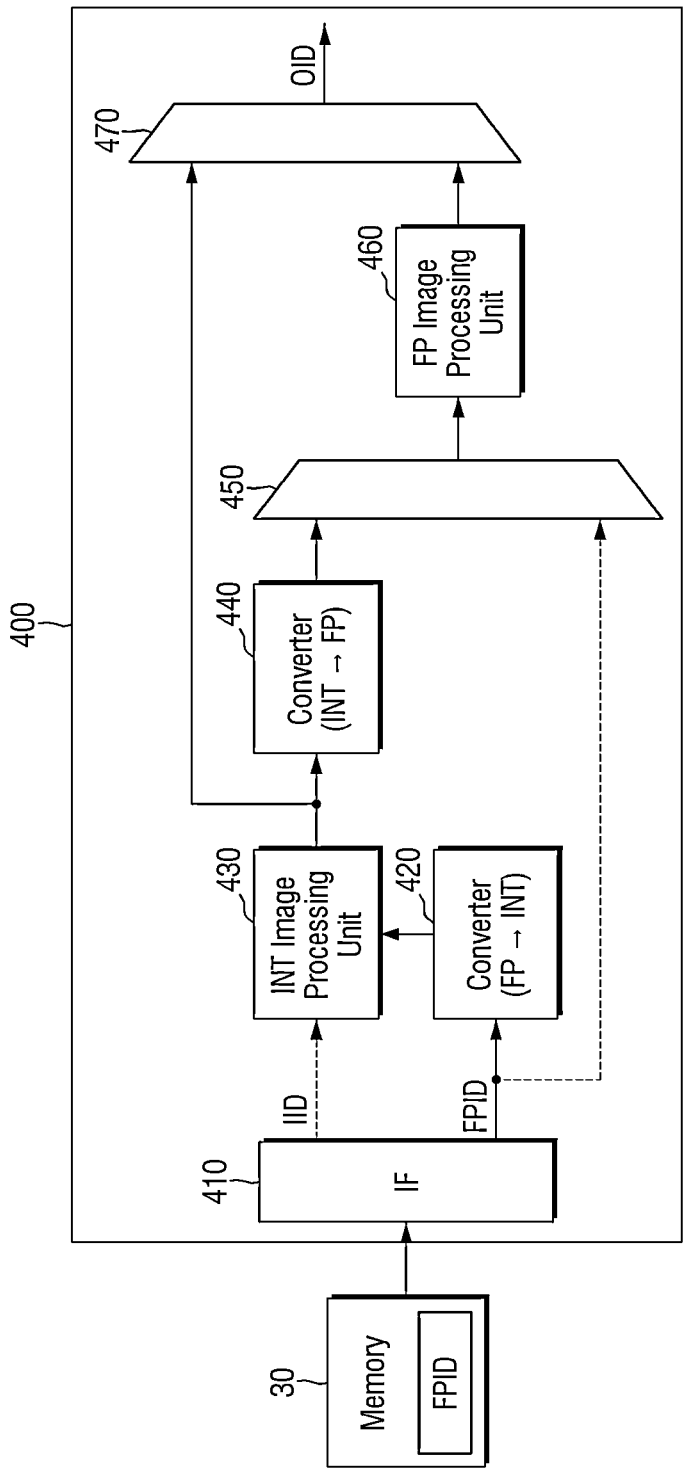

Next, FIG. 9 is a diagram showing an operation of the DPU 400 when one of the ISP 110, the GPU 120, and the MFC 130 writes the floating-point format image data FPID as the processing result to the memory 30 and the arithmetic on the floating-point format image data FPID is generated by the integer image processing unit 430.

Referring to FIG. 9, when the image data provided from the memory 30 is the floating-point format image data FPID, the interfacing device 410 may provide the floating-point format image data FPID provided from the memory 30 to the first converter 420.

When the arithmetic is performed on the floating-point format image data FPID by the integer image processing unit 430, the first converter 420 performs a conversion operation of the image data and outputs the converted image data to the integer image processing unit 430.

Thereafter, when the arithmetic by the floating-point image processing unit 460 is performed, the second converter 440 performs a conversion operation on the output of the integer image processing unit 430 and outputs the converted output to the floating-point image processing unit 460.

Further, the floating-point image processing unit 460 may perform the floating-point arithmetic related to the HDR processing such as color gamut mapping and tone mapping to generate the output image data OID.

When the arithmetic by the floating-point image processing unit 460 is not required, the second converter 440 may be disabled. The second multiplexer 470 may output the output of the integer image processing unit 430 as the output image data OID.

Figure 10:
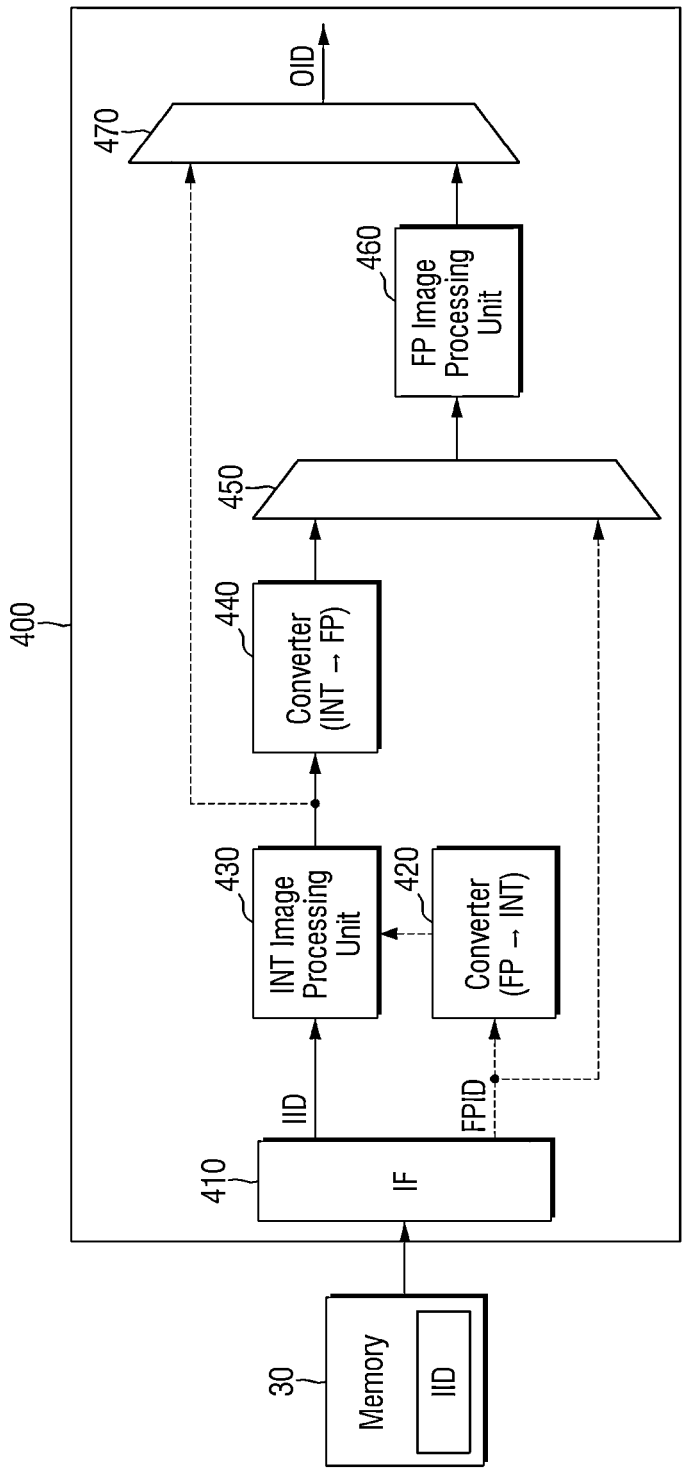

Next, FIG. 10 is a diagram illustrating an operation of the DPU 400 when one of the ISP 110, the GPU 120, and the MFC 130 writes the fixed-point format image data IID as the processing result to the memory 30, and both the arithmetic on the fixed-point format image data IID by the integer image processing unit 430 and the arithmetic on the fixed-point format image data IID by the floating-point image processing unit 460 are required.

Referring to FIG. 10, when the image data provided from the memory 30 is the fixed-point format image data IID, the interfacing device 410 may provide the fixed-point format image data IID provided from the memory 30 to the integer image processing unit 430.

Further, when the arithmetic by the floating-point image processing unit 460 is performed, the second converter 440 may perform a conversion operation on the output of the integer image processing unit 430 and outputs the converted output to the floating-point image processing unit 460.

Then, the floating-point image processing unit 460 may perform the floating-point arithmetic related to the HDR processing such as color gamut mapping and tone mapping to generate the output image data OID.

Figure 11:
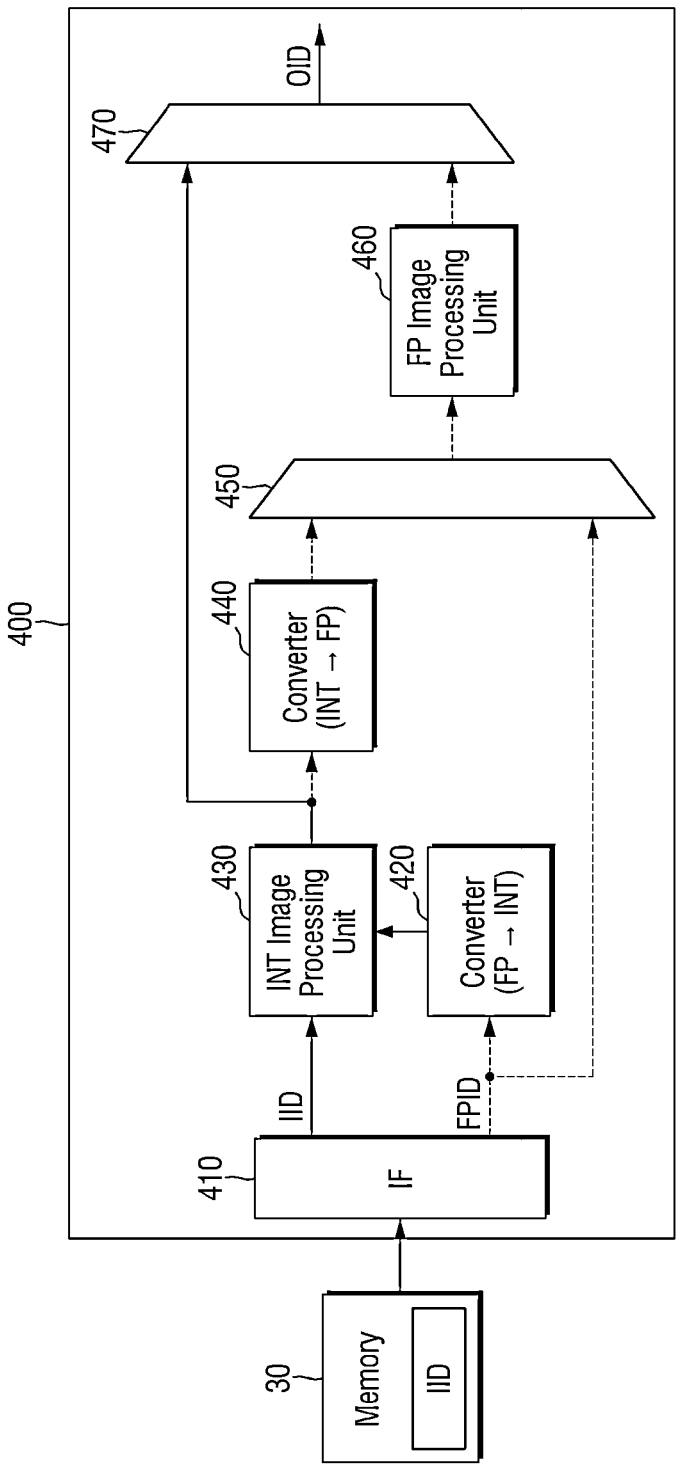

Next, FIG. 11 is a diagram illustrating an example operation of the DPU 400 when one of the ISP 110, the GPU 120, and the MFC 130 writes the fixed-point format image data IID as the processing result to the memory 30, and the arithmetic on the fixed-point format image data IID by the integer image processing unit 430 is performed, but the arithmetic thereon by the floating-point image processing unit 460 is not required.

Referring to FIG. 11, when the image data provided from the memory 30 is the fixed-point format image data IID, the interfacing device 410 may provide the fixed-point format image data IID provided from the memory 30 to the integer image processing unit 430.

Further, when the arithmetic by the floating-point image processing unit 460 is not required, the second converter 440 is disabled and does not perform a conversion operation. Accordingly, the output of the integer image processing unit 430 may be generated as the output image data OID.

In this way, the DSP 400 according to this embodiment provides various arithmetic paths based on a type of the image data provided from the memory 30. In particular, the high-quality image data may be generated and output by excluding a path in which the integer arithmetic is performed on the image data processed in the ISP 110, the GPU 120 and the MFC 130 from the DPU 400 but including a path in which the floating-point arithmetic directly related to the HDR processing is performed on the image data processed in the ISP 110, the GPU 120 and the MFC 130 into the DPU 400.

Figure 12:
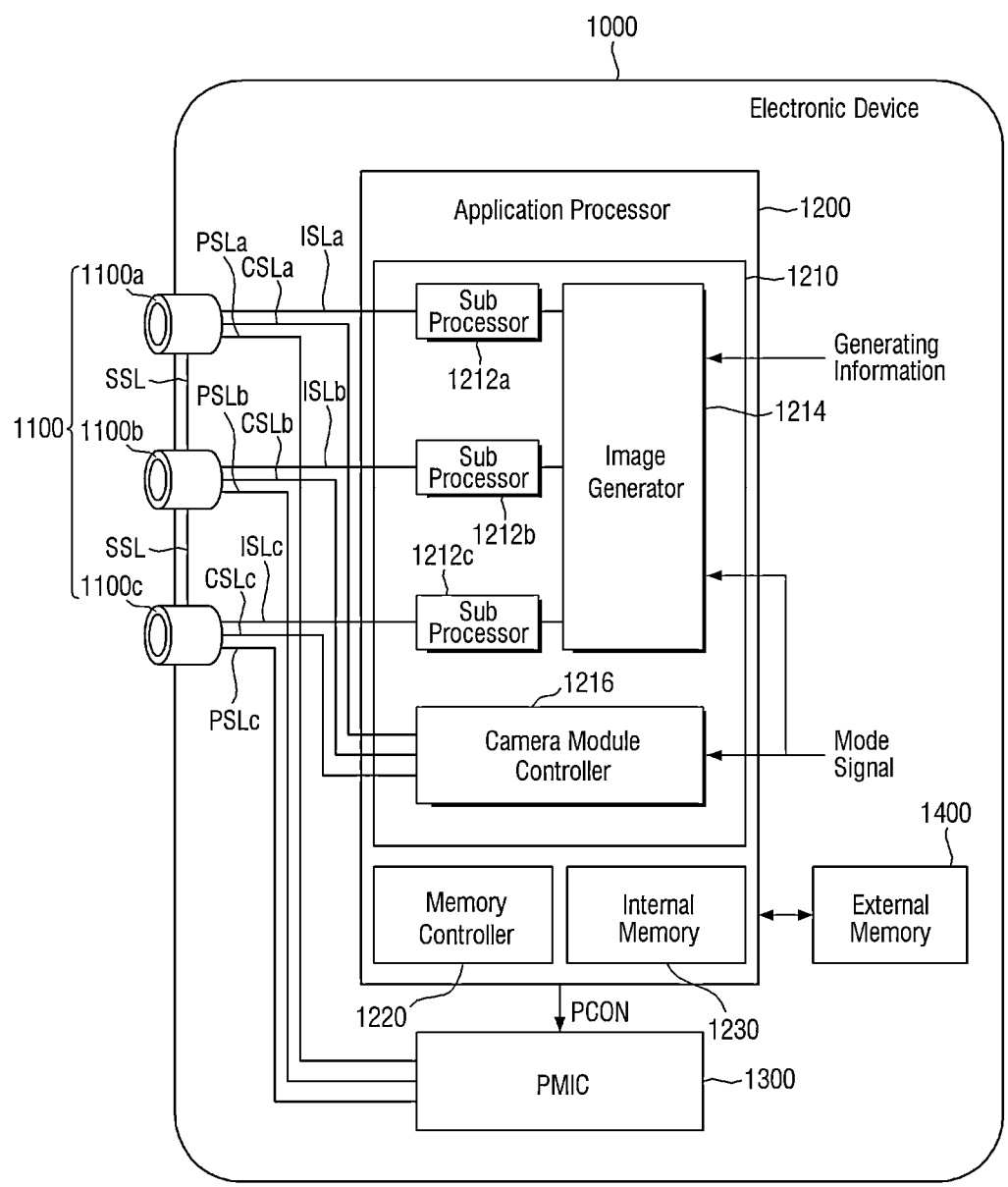
FIG. 12 is a block diagram of a mobile device including a multi-camera module.

FIG. 12 is a block diagram of a mobile device including a multi-camera module.

Referring to FIG. 12, a mobile device 1000 may include a camera module group 1100, an application processor 1200, a power management integrated circuit (PMIC) 1300 and an external memory 1400. The camera module group 1100 may include a plurality of camera modules 1100a, 1100b, and 1100c. Although FIG. 12 shows an embodiment in which three camera modules 1100a, 1100b, and 1100c are arranged, embodiments are not limited thereto. In some example embodiments, the camera module group 1100 may be modified to include only two camera modules, or n (n is a natural number equal to or larger than 4) camera modules.

In some example embodiments, one (e.g., 1100c) of the plurality of camera modules 1100a, 1100b, and 1100c may be, for example, a vertical-type depth camera for extracting depth information using IR (Infrared Ray). In this case, the application processor 1200 may merge image data provided from the depth camera and image data provided from another camera module (e.g., 1100a or 1100b) to generate a 3D depth image.

In some example embodiments, at least two camera modules (e.g., 1100a, and 1100b) among the plurality of camera modules 1100a, 1100b, and 1100c may have different FOVs (Field of Views). For example, optical lenses of at least two camera modules (e.g., 1100a, and 1100b) among the plurality of camera modules 1100a, 1100b, and 1100c may be different from each other. The example embodiments are not limited thereto.

Further, in some example embodiments, FOVs of the plurality of camera modules 1100a, 1100b, and 1100c may be different from each other. For example, the camera module 1100a may be an ultrawide camera, the camera module 1100b may be a wide camera, and the camera module 1100c may be a tele camera. The example embodiments are not limited thereto. In this case, the optical lenses of the plurality of camera modules 1100a, 1100b, and 1100c may also be different from each other. The example embodiments are not limited thereto.

In some example embodiments, the plurality of camera modules 1100a, 1100b, and 1100c may be disposed to be physically separated from each other. That is, the plurality of camera modules 1100a, 1100b, and 1100c may not use a sensing area of one image sensor in a divided manner, but an independent image sensor may be disposed inside each of the plurality of camera modules 1100a, 1100b, and 1100c.

The application processor 1200 may include an image processing device 1210, a memory controller 1220, and an internal memory 1230. The application processor 1200 may be implemented as a component separate from the plurality of camera modules 1100a, 1100b, and 1100c, for example, as a separate semiconductor chip.

The image processing device 1210 may include a plurality of sub-image processors 1212a, 1212b, and 1212c, an image generator 1214 and a camera module controller 1216.

The image processing device 1210 may include a plurality of sub-image processors 1212a, 1212b, and 1212c. The number thereof may correspond to the number of the plurality of camera modules 1100a, 1100b, and 1100c. In some example embodiments, the plurality of sub-image processors 1212a, 1212b, and 1212c may correspond to the ISP (110 in FIG. 4) as described above.

Image data generated from the camera module 1100a may be transmitted to the sub-image processor 1212a via an image signal line ISLa. Image data generated from the camera module 1100b may be transmitted to the sub-image processor 1212b via an image signal line ISLb. Image data generated from the camera module 1100c may be transmitted to the sub-image processor 1212c via an image signal line ISLc. Such image data transmission may be performed using, for example, a camera serial interface (CSI) based on a MIPI (Mobile Industry Processor Interface). The example embodiments are not limited thereto.

In some example embodiments, one sub-image processor may correspond to a plurality of camera modules. For example, the sub-image processor 1212a and the sub-image processor 1212c may not be implemented in a separate manner from each other as shown, but may be integrated into and implemented as a single sub-image processor. One of the image data provided from the camera module 1100a and the image data provided from the camera module 1100c may be selected by a selection element (e.g., a multiplexer), and then the selected data may be provided to the integrated sub-image processor. In this connection, the sub-image processor 1212b may not be integrated into the single sub-image processor, and may receive the image data provided from camera module 1100b.

Further, in some example embodiments, the image data generated from the camera module 1100a may be provided to the sub-image processor 1212a via the image signal line ISLa. The image data generated from the camera module 1100b may be provided to the sub-image processor 1212b via the image signal line ISLb. The image data generated from the camera module 1100c may be provided to the sub-image processor 1212c via the image signal line ISLc. Further, the image data processed by the sub-image processor 1212b may be provided directly to the image generator 1214. One of the image data processed by the sub-image processor 1212a and the image data processed by the sub-image processor 1212c may be selected by a selection element (e.g., a multiplexer). The selected one may be provided to the image generator 1214.

Each of the sub-image processors 1212a, 1212b, and 1212c may perform noise Image processing such as bad pixel correction, 3A adjustment (Auto-focus correction, Auto-white balance, Auto-exposure), noise reduction, sharpening, gamma control, and remosaic, etc. on the image data provided from each of the camera modules 1100a, 1100b, and 1100.

In some example embodiments, remosaic signal processing may be performed in each of the camera modules 1100a, 1100b, and 1100c, and then each processing result may be provided to each of the sub-image processors 1212a, 1212b, and 1212c.

The image data processed by each of the sub-image processors 1212a, 1212b, and 1212c may be provided to the image generator 1214. The image generator 1214 may generate an output image using the image data provided from each of the sub-image processors 1212a, 1212b, and 1212c based on image generation information or a mode signal. In some example embodiments, the image generator 1214 may correspond to the DPU (400 in FIG. 4) as described above. That is, the floating-point format image data processed and output by and from each of the sub-image processors 1212a, 1212b, and 1212c may be provided to the DPU (400 in FIG. 4) which in turn may process the received floating-point format image data.

Specifically, the image generator 1214 may merge at least some of the image data respectively generated from the image processors 1212a, 1212b, and 1212c based on the image generation information or the mode signal, thereby generating the output image as the merging result. Further, the image generator 1214 may select one of the image data respectively generated from the image processors 1212a, 1212b, and 1212c based on the image generation information or the mode signal, thereby generating the output image as the selected one.

In some example embodiments, the image generation information may include a zoom signal or a zoom factor. Further, in some example embodiments, the mode signal may be, for example, a signal based on a mode selected by a user.

In some example embodiments, the image generator 1214 may receive a plurality of image data having different exposure times from at least one of the plurality of sub-image processors 1212a, 1212b, and 1212c, and may perform the HDR (high dynamic range) processing on the plurality of image data, thereby generating merged image data having an increased dynamic range.

The camera module controller 1216 may provide a control signal to each of the camera modules 1100a, 1100b, and 1100c. The control signal generated from the camera module controller 1216 may be provided to a corresponding one of the camera modules 1100a, 1100b, and 1100c via a corresponding one of control signal lines CSLa, CSLb, and CSLc separated from each other.

Based on the image generation information including the zoom signal, or the mode signal, one of the plurality of camera modules 1100a, 1100b, and 1100c may be designated as a master camera (e.g., 1100b) while the remaining camera modules (e.g., 1100a, and 1100c) may be designated as slave cameras. The information may be included in the control signal and may be provided to a corresponding one of the camera modules 1100a, 1100b, and 1100c via a corresponding one of the control signal lines CSLa, CSLb, and CSLc separated from each other.

Depending on the zoom factor or the mode signal, the camera module acting as the master or slave camera may vary. For example, when a FOV of the camera module 1100a is larger than that of the camera module 1100b and the zoom factor indicates a low zoom magnification, the camera module 1100a may act as a master camera, while the camera module 1100b may act as a slave camera. Conversely, when the zoom factor indicates a high zoom magnification, the camera module 1100b may act as a master camera, while the camera module 1100a may act as a slave camera.

In some example embodiments, the control signal provided from the camera module controller 1216 to each of the camera modules 1100a, 1100b, and 1100c may include a sync enable signal. For example, when the camera module 1100b acts as a master camera and the camera modules 1100a and 1100c act as slave cameras, the camera module controller 1216 may transmit the sync enable signal to the camera module 1100b. Upon receiving the sync enable signal, the camera module 1100b may generate a sync signal based on the sync enable signal, and may provide the generated sync signal to the camera modules 1100a and 1100c via a sync signal line SSL. The camera module 1100b and the camera modules 1100a and 1100c may be synchronized with the sync signal and may transmit the image data to the application processor 1200.

In some example embodiments, the control signal provided from the camera module controller 1216 to the plurality of camera modules 1100a, 1100b, and 1100c may include mode information based on the mode signal. Based on this mode information, the plurality of camera modules 1100a, 1100b, and 1100c may operate in a first operation mode or a second operation mode in relation to a sensing speed.

In the first operation mode, each of the plurality of camera modules 1100a, 1100b, and 1100c may generate an image signal at a first speed (for example, generate an image signal of a first frame rate) and may encode an image signal at a second speed higher than the first speed (for example, encode an image signal of a second frame rate higher than the first frame rate), and then may transmit the encoded image signal to the application processor 1200. In this connection, the second speed may be lower than or equal to 30 times of the first speed.

The application processor 1200 may store the received image signal, that is, the encoded image signal in an internal memory 1230 or storage 1400 external to the application processor 1200, and then may read out the encoded image signal from the memory 1230 or the storage 1400 and then may decode the read-out signal and may display image data generated based on the decoded image signal. For example, a corresponding one of the plurality of sub-image processors 1212a, 1212b, and 1212c of the image processing device 1210 may perform the decoding and may perform the image processing on the decoded image signal.

In the second operation mode, each of the plurality of camera modules 1100a, 1100b, and 1100c may generate an image signal at a third speed lower than the first speed (for example, generate an image signal of a third frame rate lower than the first frame rate), and may transmit the image signal to the application processor 1200. The image signal provided to the application processor 1200 may be an unencoded signal. The application processor 1200 may perform the image processing on the received image signal or store the received image signal in the memory 1230 or the storage 1400.

The PMIC 1300 may supply power, for example, a power voltage to each of the plurality of camera modules 1100a, 1100b, and 1100c. For example, under control of the application processor 1200, the PMIC 1300 may supply first power to the camera module 1100a via a first power signal line PSLa, and may supply second power to the camera module 1100b via a second power signal line PSLb, and may supply third power to the camera module 1100c via a third power signal line PSLc.

The PMIC 1300 may generate power corresponding to each of the plurality of camera modules 1100a, 1100b, and 1100c and adjust a level of the power, based on a power control signal PCON from the application processor 1200. The power control signal PCON may include a power adjustment signal related to an operation mode of each of the plurality of camera modules 1100a, 1100b, and 1100c. For example, the operation mode may include a low power mode. In this connection, the power control signal PCON may include information about a camera module operating in the low power mode and a power level set for the camera module. Levels of the powers respectively provided to the plurality of camera modules 1100a, 1100b, and 1100c may be the same as or different from each other. Further, a level of the power provided thereto may dynamically vary.

Additionally, ISP 110, GPU, 120, MFC 120, display processing unit 120, CPU 300, Memory controller 200, DPU 400, FP image processing unit 440, INT image processing unit 430, application processor 1200, image generator 1214, sub processors 1212, camera module controller 1216, memory controller 1220 and/or the components included therein may include processor(s) and/or processing circuitry such as hardware including logic circuits; a hardware/software combination such as a processor executing software; or a combination thereof. For example, the processor(s) and/or processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

Processor(s) and/or processing circuitry may be configured to perform actions or steps by being specifically programmed to perform those action or steps (such as with an FPGA or ASIC) or may be configured to perform actions or steps by executing instructions received from a memory, or a combination thereof.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

What is claimed is:

1. A mobile device comprising:
 a processor configured to
  receive raw image data,
  process the raw image data into processed image data comprising one of floating-point format image data and fixed-point format image data, and
  output the processed image data;
 a memory configured to store therein the processed image data; and a display processing unit configured to
receive the processed image data stored in the memory,
perform high dynamic range (HDR) processing on the processed image data comprising the floating-point format image data through a first path of the display processing unit, and
perform integer image processing on the processed image data comprising the fixed-point format image data through a second path of the display processing unit that is different than the first path.

2. The mobile device of claim 1, wherein the processor includes a graphic processing unit configured to perform rendering on the raw image data and output the floating-point format image data as a rendering result.

3. The mobile device of claim 1, wherein the processor includes an image signal processor configured to process the raw image data generated from a plurality of camera modules into the floating-point format image data and output the floating-point format image data.

4. The mobile device of claim 1, wherein the display processing unit includes a floating-point image processing unit configured to perform floating-point arithmetic related to the HDR processing,
wherein the floating-point format image data stored in the memory is not subjected to a separate conversion process and the floating-point format image data is directly transferred from the memory to the floating-point image processing unit.

5. The mobile device of claim 4, wherein the floating-point arithmetic includes color gamut mapping and tone mapping.

6. The mobile device of claim 4, wherein the display processing unit further includes:
an integer image processing unit configured to perform integer arithmetic; and
an interfacing device for receiving the processed image data from the memory,
wherein the interfacing device is configured to perform at least one of
in response to the processed image data provided from the memory being the floating-point format image data, provide the floating-point format image data to the floating-point image processing unit; or
in response to the processed image data provided from the memory being fixed-point format image data, provide the fixed-point format image data to the integer image processing unit.

7. The mobile device of claim 6, wherein the mobile device further comprises a converter configured to
receive the floating-point format image data from the interfacing device,
convert the floating-point format image data into second fixed-point format image data, and then
provide the second fixed-point format image data to the integer image processing unit.

8. The mobile device of claim 1, wherein the processor includes a multi format codec configured to encode or decode the raw image data into the processed image data comprising the floating-point format image data and output the floating-point format image data.

9. The mobile device of claim 1, wherein the mobile device further comprises:
a display driver integrated circuit configured to generate data voltage based on an output of the display processing unit; and
a display panel configured to display an image based on the data voltage.

10. A mobile device comprising:
a memory configured to store therein floating-point format image data; and
a display processing unit configured to
receive the floating-point format image data stored in the memory, and
perform high dynamic range (HDR) processing on the floating-point format image data,
wherein the display processing unit includes
an integer image processing unit configured to perform integer arithmetic, and
a first converter configured to
receive the floating-point format image data,
convert the floating-point format image data into fixed-point format image data, and
provide the fixed-point format image data to the integer image processing unit.

11. The mobile device of claim 10, wherein the display processing unit further includes:
a second converter configured to receive an output of the integer image processing unit and convert the received output into floating-point format image data; and
a first multiplexer configured to select one of the floating-point format image data provided from the memory and the floating-point format image data output from the second converter.

12. The mobile device of claim 11, wherein the display processing unit further includes:
a floating-point image processing unit configured to receive the selected one of the floating-point format image data from the first multiplexer and perform floating-point arithmetic related to the HDR processing on the selected one; and
a second multiplexer configured to select one of an output of the integer image processing unit and an output of the floating-point image processing unit.

13. The mobile device of claim 10, wherein the display processing unit further includes an interfacing device for receiving image data from the memory,
wherein the interfacing device is configured to perform at least one of:
in response to the image data provided from the memory being the floating-point format image data, provide the floating-point format image data to the first converter; or
in response to the image data provided from the memory being the fixed-point format image data, provide the fixed-point format image data to the integer image processing unit.

14. The mobile device of claim 10, wherein the HDR processing includes color gamut mapping and tone mapping.

15. The mobile device of claim 10, wherein the mobile device further comprises a graphic processing unit configured to perform rendering on raw image data and generate the floating-point format image data as a rendering result and store the generated floating-point format image data in the memory.

16. The mobile device of claim 10, wherein the mobile device further comprises an image signal processor configured to process raw image data generated from a plurality of camera modules to generate the floating-point format image data, and store the floating-point format image data in the memory.

17. The mobile device of claim 10, wherein the mobile device further comprises a multi format codec configured to encode or decode raw image data to generate the floating-point format image data and store the floating-point format image data in the memory.

18. A system on chip (SoC) comprising:
   a processor configured to
      receive raw image data,
      process the raw image data to provide processed image data, and
      store the processed image data in a memory;
   an integer image processing unit configured to perform integer arithmetic;
   a floating-point image processing unit configured to perform floating-point arithmetic related to high dynamic range (HDR) processing; and
   an interfacing device for receiving the processed image data from the memory,
   wherein the interfacing device is configured to perform at least one of:
   in response to the processed image data provided from the memory being floating-point format image data, directly provide the floating-point format image data to the floating-point image processing unit; or
   in response to the processed image data provided from the memory being fixed-point format image data, provide the fixed-point format image data to the integer image processing unit.

19. The SoC of claim 18 further comprising a first converter configured to receive the floating-point format image data, convert the floating-point format image data into fixed-point format image data and provide the fixed-point format image data to the integer image processing unit,
   wherein the interfacing device is configured to, in response to the processed image data provided from the memory being the floating-point format image data, provide the floating-point format image data to the first converter.

20. The SoC of claim 19 further comprising:
   a second converter configured to receive an output of the integer image processing unit and convert converts the received output into floating-point format image data;
   a first multiplexer configured to select one of the floating-point format image data provided from the memory and the floating-point format image data output from the second converter; and
   a second multiplexer configured to select one of the output of the integer image processing unit and an output of the floating-point image processing unit.

* * * * *